United States Patent Office 2,831,906
Patented Apr. 22, 1958

2,831,906

PROCESS FOR MAKING CYCLOHEPTATRIENES

Hilmer E. Winberg, Wilmington, Del., assignor to E. I. du Pont de Nemours and Company, Wilmington, Del., a corporation of Delaware No Drawing. Application October 5, 1956
Serial No. 614,068

3 Claims. (Cl. 260—666)

This invention relates to a novel process for making 1,3,5-cycloheptatriene ($C_7H_8$) and substituted derivatives thereof.

The 1,3,5-cycloheptatrienes have been known for some time. However, despite the interesting structure with a plurality of double bonds in a 7-membered ring, the use of these compounds has been severely limited by the difficulties inherent in the preparation thereof. For instance, 1,3,5-cycloheptatriene by the classical route is prepared in an eight-step synthesis, starting with cyclohexanone [Kohler et al., J. Am. Chem. Soc. 61, 1057 (1939)].

Recently interest has been aroused in the cycloheptatrienes since it has been found that oxidation thereof affords a convenient route to the biologically active tropolones [Doering et al., J. Am. Chem. Soc 72, 2305 (1950), 73, 828 (1951)]. These workers prepared the cycloheptatrienes by irradiation of aromatic hydrocarbons with ultraviolet light in the presence of diazomethane. While this is a more straightforward route than the classical one, it too has obvious limitations due to the well known handling problems associated with the explosive and toxic diazomethane.

Still more recently (British Patent 747,277 and French Patent 1,091,126), it has been reported that the cycloheptatrienes can be prepared by thermal isomerization of the bicyclo(2,2,1)-2,5-heptadienes which can be prepared by the Diels-Alder condensation of acetylene with the cyclopentadienes. However, in the thermal rearrangement appreciable quantities of the starting material necessarily undergo the reverse Diels-Alder reaction resulting in the formation of the ultimate starting materials, i. e., acetylene and the cyclopentadienes.

It is an object of this invention to provide a simpler method for preparing the 1,3,5-cycloheptatrienes.

The novel method requires the pyrolysis of 7,7-dihalobicyclo(4,1,0)heptanes at temperatures of at least about 300° C. to form the desired 1,3,5-cycloheptatriene.

The process is free from complexity, requiring only one reactant, namely, a 7,7-dihalobicyclo(4,1,0)heptane and resulting in the formation of only the cycloheptatriene, contaminated with only minor amounts of unpyrolyzed starting material and decomposition products and the isomeric methylbenzenes.

A great variety of products can be prepared in accordance with the invention depending on the 7,7-dihalobicyclo(4,1,0)heptane selected as the starting material. Thus the halogen atoms on the 7 carbon of the heptane can be for example chlorine, bromine, fluorine and bromine or fluorine and chlorine. The nuclear carbon atoms other than the 7 carbon of the 7,7-dihalobicyclo(4,1,0)-heptane can be substituted with aliphatic, cycloaliphatic or aromatic radicals. Because of readier availability and better overall reaction efficiency it is preferred that the nuclear carbon atoms (other than the 7 carbon) of the heptane be bonded only to hydrogen, hydrocarbon or hydrocarbonoxy radicals. An especially outstanding group are those heptanes containing less than four nuclear substituents, each having less than seven carbon atoms and being free of aliphatic unsaturation.

The 7,7-dihalobicyclo(4,1,0)heptanes can be readily prepared by direct condensation of the desired trihalomethane and the necessary cyclohexene in the presence of stoichiometric amounts of strong organic bases. The preparation is more fully disclosed by Doering et al. in J. Am. Chem. Soc. 76, 6162 (1954).

The pyrolysis can be effected either batchwise or continuously, although for ease of operation the latter is generally preferred. The reaction conditions are quite flexible. Reaction pressures can vary from above atmospheric to substantially atmospheric pressure or even subatmospheric pressures in continuous flow systems. The reaction pressure to be used will of course depend upon the relative concentration of the reactants, the temperatures being used, the contact time, the free space volume of the reactor and the like, all of which variables are well known in the art for pyrolysis reactions.

The necessary temperature, as is true in pyrolysis reactions generally, is an interrelated variable with both pressure and time. Thus, with the substantially atmospheric or lower pressures obtaining in continuous flow systems and the relatively short contact times normally encountered therein, the temperatures required for reasonable conversions must be higher than those in static systems. Conversely, in the latter type systems which are generally used in the lower temperature ranges, reaction times for appreciable conversions will normally be greater than in continuous flow systems. Generally speaking, the reaction is carried out in the range of from about 300° C. to about 1000° C. and higher. As a rule higher conversions are obtained at higher temperatures. However, due to possible decomposition or polymerization of the cyclictriene products, the pyrolysis will generally be carried out at temperatures in the range of 400–600° C.

For static conditions under autogenous pressure, temperatures from 300 to about 400° C. will generally be used for reaction times ranging from a few hours to a few days. In continuous flow systems, contact times will generally vary from as little as 0.01 second or shorter to as long as 5–10 minutes or longer, and normally from about 0.01 second to about 60 seconds. Reaction temperatures ranging from 400° C. to about 1000° C. are useful in such systems with 450 to 550° C. being preferred.

In continuous flow systems it is frequently desirable to recycle the product obtained through the pyrolysis zone. However, in view of the unsaturated nature of the product and the fact that the starting dihalobicycloheptanes boil appreciably higher, it is more effective to strip the reaction products of the desired low boiling material first before recycling any unreacted dihalobicycloheptane.

The reaction mixture resulting from the pyrolysis is worked up very simply. The gaseous materials coming from the reaction zone are trapped immediately and directly in receivers held at lower temperatures, e. g., room temperature or below, and then fractionated directly. Generally speaking, the crude reaction mixture will consist only of minor amounts of decomposition products and unpyrolyzed 7,7dihalobicyclo(4,1,0)heptanes, and as the only major components the desired 1,3,5-cycloheptatrienes and the isomeric methyl substituted benzenes corresponding to the cycloheptatriene desired. Conventionally, the latter two components are distilled from the reaction mixture and are usually obtained as a binary, distilling over the range from slightly below to just about the boiling point of the lower boiling isomeric methylbenzenes. Careful precision fractionation of this first stripped product, results in the separation and isolation of the desired higher boiling 1,3,5-cycloheptatrienes.

The reaction vessels used are those conventional in the art although for higher product purity glass or glass-lined equipment is particularly suitable.

The requisite energy to achieve the desired temperature range may be supplied by external heat. However, other methods of supplying the necessary energy equally recognized as conventional in the art can obviously also be used. For instance, the energy can be supplied to the reaction zone by internal heat, as by internal electrical heating, using hot metal such as a tungsten filament heated by passage of an electric current. The necessary energy can also be supplied by spark, arc, or discharge techniques. These variations in source of energy supply are recognized in pyrolysis reactions and as such form no part of the invention.

The pyrolysis zone as is conventional in such reactions can be free space within the reactor or if desired this zone can be packed with one or more of the conventional packing materials such as glass beads, tubing or wool, the various inorganic powders, stone or ceramic grids, chips or plates, diatomaceous earth and the like. All such inert packing material serves to give the maximum free surface within the given reactor area. The various metal packing materials are generally to be avoided in view of the scission of hydrohalides effected by the pyrolysis.

The following examples in which parts given are by weight are submitted to illustrate the invention further, not to limit it.

*Example 1*

A vertical, tubular reactor containing a section about three diameters long filled with short lengths of tubular glass packing was heated to an internal temperature of 490° C. Over a period of 2.5 hours and with a slow stream of nitrogen passing through the reactor, 75 parts of 7,7-dichlorobicyclo(4,1,0)heptane was dropped into the pyrolysis zone while maintaining the internal temperature between 490–520° C. The products were collected in a glass pot at atmospheric pressure. Upon distillation of the liquid reaction product there was obtained 24 parts (57% of theory) of a liquid mixture of $C_7H_8$ hydrocarbon boiling at 107–110° C., $n_D^{25}$ 1.4970–1.5030.

The mixture contained no halogen and reacted with 2% aqueous potassium permanganate and with bromine in carbon tetrachloride solution. Nuclear magnetic resonance spectra showed the major constituent to be toluene. Comparison of the infra-red spectrum of the mixture with those of toluene and cycloheptatriene showed the mixture to consist of approximately 65% toluene and 35% 1,3,5-cycloheptatriene. Quantitative hydrogenation showed a hydrogen absorption of 0.0217 and 0.0212 gram per gram of mixture. Using these values and on the basis of the unsaturation being due to cycloheptatriene, the average hydrogenation value indicates the mixture to contain 33% cycloheptatriene, agreeing well with the infrared data. The pure 1,3,5-cycloheptatriene boils at approximately 114.5° C. at atmospheric pressure.

The product was further characterized by formation of a derivative. Thus a mixture of one part of maleic anhydride and 2.9 parts of the above $C_7H_8$ mixture in about 10 parts of xylene was heated at the reflux for 12 hours and the solvent then removed by distillation at reduced pressure. The resultant crude white residue melting at 94–98° C. was recrystallized from hexane. There was thus obtained the pure Diels-Alder adduct of 1,3,5-cycloheptatriene and maleic anhydride as white crystals melting at 102–104° C. Kohler et al. J. Am. Chem. Soc. 61, 1057 (1939), report a melting point of 102–104° C.

*Example 2*

Under substantially identical conditions, as Example 1, 57 parts of the 7,7-dichlorobicyclo(4,1,0)heptane was passed through the pyrolysis reactor over a period of 2.25 hours with the internal temperature ranging from 498–520° C. There was obtained 18 parts (58% of theory) of a $C_7H_8$ liquid mixture, boiling at 107–111° C. at atmospheric pressure. Infrared analysis indicated 33–35% cycloheptatriene and quantitative hydrogenation showed 31% of cycloheptatriene.

The maleic anhydride adduct of the above $C_7H_8$ mixture similarly prepared as in Example 1 melted at 100.5–102.0° C. after recrystallization from n-hexane.

The product was still further characterized by conversion to tropylium bromide (i. e., cycloheptatrienylium bromide) as described by Doering et al., J. Am. Chem. Soc. 76, 3205 (1954). Thus, 11.0 parts of a mixture of the $C_7H_8$ products of Examples 1 and 2 diluted with 19.0 parts of carbon tetrachloride was cooled in an ice/water bath and a solution of 6.45 parts of bromine in 19.0 parts of carbon tetra chloride then added slowly. The solvents were removed under vacuum and the solid residue heated at 70° C. under a pressure corresponding to 1–4 mm. of mercury for nine hours. The solid residue was washed with diethyl ether and acetone and then dried. There was thus obtained 0.8 part of the salt-like tropylium bromide as a greenish-yellow powder.

Thus in the manner of the foregoing disclosures, 7,7-dibromobicyclo(4,1,0)-6-methylheptane can be pyrolyzed to methyl-1,3,5-cycloheptatriene; 7,7-dichlorobicyclo(4,1,0)-2-propylheptane can be pyrolyzed to propyl-1,3,5-cycloheptatriene; 7-chloro-7-fluorobicyclo(4,1,0)-5-isopropyl-2-methylheptane can be pyrolyzed to isopropylmethyl-1,3,5-cycloheptatriene; 7-bromo-7-chlorobicyclo(4,1,0)-4-isopropylheptane can be pyrolyzed to isopropyl-1,3,5-cycloheptatriene; 7-bromo-7-fluorobicyclo(4,1,0)-4-phenylheptane can be pyrolyzed to phenyl-1,3,5-cycloheptatriene; 7,7-dichlorobicyclo(4,1,0)-4-cyclohexylheptane can be pyrolyzed to cyclohexyl-1,3,5-cycloheptatriene; 7,7-dibromobicyclo(4,1,0)-3-methoxyheptane can be pyrolyzed to methoxy-1,3,5-cycloheptatriene, and the like. The necessary dihalobicyclo(4,1,0)heptanes all can be prepared in the manner of Doering et al., J. Am. Chem. Soc. 76, 6162 (1954), from the respective cyclohexenes and the necessary haloform.

The various 1,3,5-cycloheptatrienes thus prepared can all be oxidized in the manner of Doering et al., J. Am. Chem. Soc. 72, 2305 (1950), and 73, 828 (1951), to the corresponding tropolones. These cycloheptatrienes can also be converted to the respective tropylium bromides. Simple derivatives of the tropolones are generally useful as pesticides, fungicides, and plant regulant materials, as is well known in the art (see, for instance, U. S. Patents 2,623,898, 2,675,400 and 2,675,403).

The tropylium ion represents a new non-classical aromatic system and is thus useful in furthering research—see Fateley et al., J. Am. Chem. Soc. 77, 249 (1955), and Doering et al., ibid., 76, 3203 (1954). The tropolones are useful as metal sequestering agents since they form stable metal chelates with metals such as beryllium, cobalt, copper, nickel, and zinc—see Fernelius et al., Nature 170, 247 (1952), and Bryant et al., J. Am. Chem. Soc. 75, 3784 (1953), and 76, 1696 (1954). The tropolones have marked bactericidal and bacteriostatic action, especially the latter—see Katsura, Zentr. Bakteriol. Parasitenk, Abt. I, Orig. 161, 2061 (1954); C. A. 48, 12899a (1954), where data on tropolone and isopropyltropolone (henokitiol), also referred to as thujaplicin, are given.

It should be noted that the various 1,3,5-cycloheptatrienes discussed above may also exist in the isomeric norcaradiene form [Doering et al., J. Am. Chem. Soc. 73, 828 (1951)]. The preparation of such isomers by the novel method disclosed herein is clearly within the scope of this invention. However, for purposes of simplicity only the trienes have been named in the specification.

I claim:

1. A method for preparing a compound of the formula $C_7H_8$ and substituted derivatives thereof which comprises subjecting a 7,7-dihalobicyclo(4,1,0)heptane to pyrolysis, at a temperature of at least about 300° C.

2. A method for preparing cycloheptatriene which comprises pyrolyzing 7,7-dichlorobicyclo(4,1,0)heptane, at a temperature of at least about 300° C.

3. The method of preparing cycloheptatrienes which comprises pyrolyzing a 7,7-dihalobicyclo(4,1,0)heptane containing less than 4 nuclear substituents, each substituent being hydrocarbon having less than 7 carbon atoms and being free of aliphatic unsaturation, at a temperature of at least about 300° C.

References Cited in the file of this patent

UNITED STATES PATENTS

| 2,647,081 | Doering et al. | July 28, 1953 |
| 2,754,337 | Chirtel | July 10, 1956 |

OTHER REFERENCES

Willstatter: Chem. Berichte, vol. JG 34–1, January–April 1901, page 135.